United States Patent [19]

Andrews, Jr. et al.

[11] Patent Number: 4,628,379
[45] Date of Patent: Dec. 9, 1986

[54] DISK RUNOUT COMPENSATOR

[75] Inventors: Thomas L. Andrews, Jr.; Thomas A. Fiers; Richard G. Laatt, all of Longmont, Colo.

[73] Assignee: Amcodyne Incorporated, Longmont, Colo.

[21] Appl. No.: 655,355

[22] Filed: Sep. 25, 1984

[51] Int. Cl.$^4$ ............................................... G11B 5/56
[52] U.S. Cl. ...................................................... 360/77
[58] Field of Search .......................................... 360/77

[56] References Cited

U.S. PATENT DOCUMENTS

| | | | |
|---|---|---|---|
| 4,135,217 | 1/1979 | Jacques et al. | 360/77 |
| 4,149,199 | 4/1979 | Chick et al. | 360/77 |
| 4,419,701 | 12/1983 | Harrison et al. | 360/77 |
| 4,536,809 | 8/1985 | Sidman | 360/77 |

Primary Examiner—George G. Stellar
Attorney, Agent, or Firm—Sheridan, Ross & McIntosh

[57] ABSTRACT

A method and apparatus are provided to compensate for the runout that commonly occurs during the reading from or writing of information on the surface of a disk medium using a read/write head. The runout relates to the distance the head is located away from a disk track center during the rotation of the disk. To maintain the head in alignment with the track center during the complete revolution of the disk, position information is obtained. This position information is used with discrete fourier transform techniques to provide a representation of the disk runout. From this representation, a compensating signal can be generated to provide movement of the head that compensates for the runout and keeps the head positioned in alignment with the track center at all times during the disk rotation.

8 Claims, 3 Drawing Figures

Microfiche Appendix Included
(1 Microfiche, 7 Pages)

DISK RUNOUT COMPENSATOR

A microfiche appendix is included in this application and consists of one microfiche having seven frames.

FIELD OF THE INVENTION

The present invention relates to method and apparatus for compensating for the runout that occurs during rotation of a disk.

BACKGROUND INFORMATION

In reading or writing information, such as data, on a disk, it is important to maintain the transducer or read/write head, which is used to read or write the information, in alignment relative to the center of the continuous track on which information is stored or to be stored. This alignment is important so that the information can be read accurately or stored properly. A problem commonly arises however in that the axis of rotation of the disk is not precisely the same as the center of the concentric tracks located on the disk. This lack of correspondence between the axis of rotation of the disk and the center of the concentric disk tracks results in a displacement of the head relative to the track center during the spinning or rotating of the disk, i.e., the head is not maintained relative to the center of the track during rotation of the disk.

This displacement from the track center may be due to a number of factors including, for example, the disk was not balanced properly so that the track center is offset relative to the disk axis of rotation. Alternatively, when the disk system was assembled initially, the axis of disk rotation was not properly aligned with the center of the concentric tracks.

The distance from the track center can be characterized as an error signal created by holding the head stationary relative to the center of one disk track and permitting the disk to rotate relative to the head. The error signal comprises the distance the head is away from the center of the one track at each instance in time during one revolution of the disk. In the case in which the head stays in alignment relative to the center of the track, a straight line is produced, i.e., there is no error in the error signal.

In a closed loop servo system involving the movement of the head relative to a concentric track, this displacement can be compensated for to a minimum degree. However, as the distance becomes relatively large, the closed loop servo system is unable to generate sufficient compensation or correction.

The present invention provides a solution to the aforementioned problem associated with disk runout. Basically, the error signal can be defined in terms of a sinusoidal signal having a number of harmonics plus a DC component or offset from a known, reference level. Because the error signal is primarily made up of the sinusoid defined by the fundamental frequency, the runout can be defined to a very good approximation as including only the offset and the fundamental frequency component of the sinusoid. The present invention uses this representation of the runout signal to generate a signal substantially equal to that of the determined runout. This generated signal is applied to cause the head to move at the desired times so that it is maintained in alignment relative to the center of the disk track having the information to be read or on which the information is to be written.

SUMMARY OF THE INVENTION

A method and apparatus are disclosed for reducing the runout associated with a disk storage device. The apparatus includes a transducer or read/write head used to read information from or write information on tracks located on a surface of the disk. The head is connected to a movable carriage assembly used in positioning the head relative to the disk surface. The carriage assembly is connected to a linear motor for use in moving the carriage assembly in a desired direction and for a desired distance.

The information stored on the disk surface includes servo or position information which is used by the apparatus to determine the position of the head relative to the disk surface. In the preferred embodiment of the present invention, the servo information is stored in designated areas, servo sectors or servo fields, defined on the disk surface. The position information is read and is received by a position determining circuit which generates a signal indicative of the position of the head relative to the disk surface. In this regard, it is common for an error signal or runout to be produced as the disk medium revolves or rotates. This error signal relates to the distance the head is positioned away from a track center during the revolution of the disk.

The runout values determined by the position determining circuit are applied to a processing unit. The processing unit uses discrete fourier transform techniques to provide a representation of the runout. From the knowledge of the runout obtained, the processing unit generates a runout compensating or correcting signal, substantially equal to the derived runout. The runout correction signal is used to cause the linear motor to move the carriage assembly and head in a desired manner so that the runout associated with the disk movement is compensated for, with the result that the head maintains a steady position relative to the track center.

Based on the foregoing, a number of objectives of the present invention can be easily seen. An apparatus and method are disclosed for maintaining a read/write head relative to a track center by eliminating the runout or wobble which frequently occurs during rotation of the disk medium. The method of the present invention offers an accurate technique for eliminating runout since it effectively provides a representation of the runout so that a signal can be generated to offset or compensate for the determined runout. With the substantial reduction or elimination of the runout, data or information can be properly written on a track center and the head can be located in alignment with the track center for accurate reading of the stored information.

Additional advantages of the present invention will become readily apparent from the following discussion, when taken in conjunction with the accompanying drawings.

DETAILED DESCRIPTION OF THE PREFERRED EMBODIMENT

In accordance with the present invention, an apparatus is disclosed for virtually eliminating or reducing runout that frequently occurs during the rotation of a magnetic disk memory. In accomplishing this desired function, a signal, comprising values or magnitudes, relating to runout at predetermined times, is defined. After obtaining a representation of the runout, the runout is removed or compensated for in the present invention. Before proceeding with the discussion of the hardware and software of the present invention, a description relating to an understanding of the runout is first provided.

Figure 1:
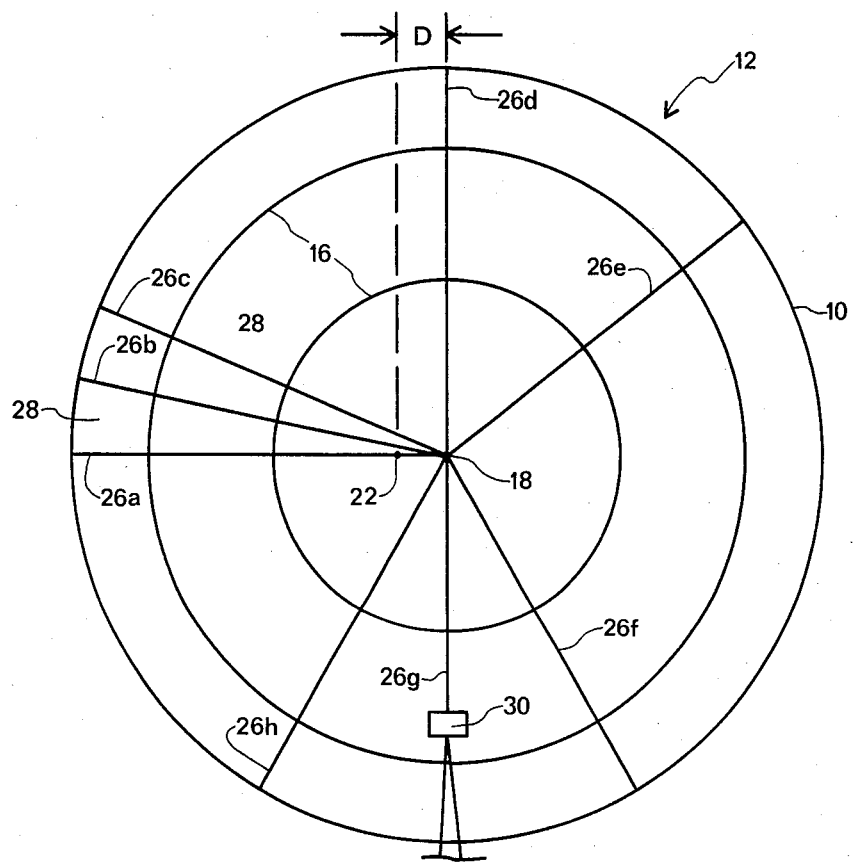
FIG. 1 is a diagrammatic illustration of a disk having a number of servo sectors and data sectors with the axis of rotation thereof being different from the center of concentric tracks formed on the disk.

With reference to FIG. 1, a diagrammatic representation of a surface 10 of a disk 12 is illustrated. The disk 12 has a number of concentric tracks 16. Each of the concentric tracks 16 is centered about a true or actual center 18 of the disk 12. The tracks 16 store information for use by a processing system which is operatively associated with the disk 12.

In connection with how disk runout occurs or is created, the disk 12 rotates about an axis of rotation 22 which is located, not through the actual disk center 18 as would be desired, but at some distance D from the disk center, as illustrated in FIG. 1.

Although it is desirable to have the axis of rotation of the disk 12 through the center 18 thereof, this is often not the case because of one or more physical factors associated with disk rotation. These factors include inaccuracies in the construction of the bearing assembly used in permitting rotation of the disk 12; an imbalance resulting in a wobble or eccentric rotation of the disk; the fact that the cartridge housing the disk 12 is frequently removed from and inserted into the disk drive which can result in an imperfect centering of the disk 12.

It should also be understood that, for the sake of illustrating the problem of runout, the axis of rotation 22 of the disk 12 is shown to be at a relatively significant distance form the disk center 18. In actual practice, the distance D is not so great but is typically in the range of 0.001-0.002 inches.

The disk 12 of the preferred embodiment has a number of servo sectors 26 and a number of data sectors 28. The servo sectors 26 are interspersed in an alternating manner among the data sectors 28 to provide an embedded servo system. In one embodiment, although each such servo sector 26 and data sector 28 are not illustrated in FIG. 1, thirty-two servo sectors 26 and thirty-two data sectors 28 are utilized. Each of the concentric tracks 16 has a portion thereof located in each of the servo sectors 26. This track portion stores servo or position information relating to the identity of the servo sectors 26. This track portion also stores position information relating to the identity of the concentric track 16 and which position information is also used in determining the position of a transducer or read/write head 30 relative to the concentric tracks 16. The transducer 30 is used in writing information on the center of the concentric tracks 16 and for reading information stored thereon. As a consequence, an important objective associated with reading and writing data or other information is to maintain the transducer 30 center. To do so, the runout which occurs because the axis of rotation 22 does not correspond to the actual center of the disk 18 must be determined and compensated for.

Figure 2:
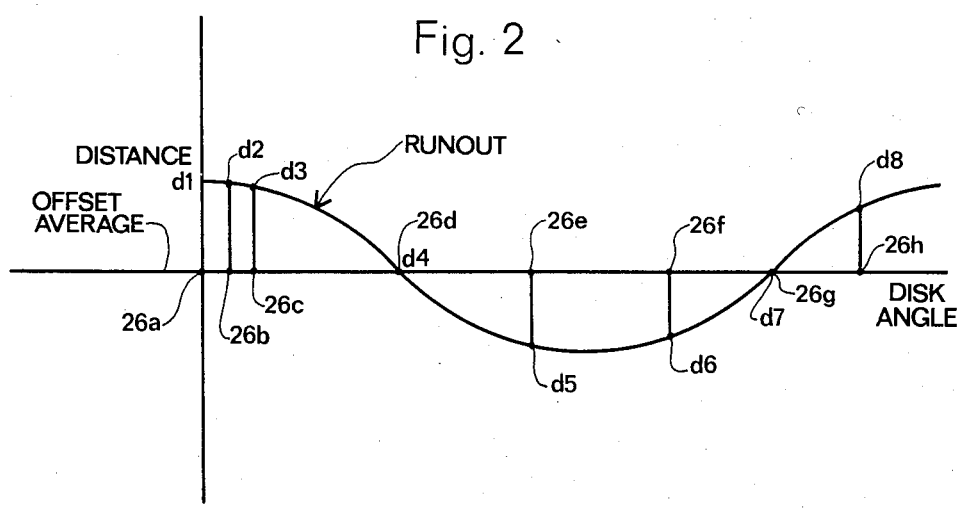
FIG. 2 is a representation of runout based on position information and which information is then synthesized using discrete fourier transform techniques to develop an accurate sinusoidal representation of the runout.

Referring to FIG. 2, a signal representation of the runout of the disk 12 of FIG. 1 in which the disk axis of rotation 22 is offset from its center 18 is provided. The signal is essentially a sinusoidal representation based on a number of discrete values obtained during one revolution of the disk 12. The curve or signal of FIG. 2 relates the distance the transducer 30 is located relative to the center of a concentric track 16 to the angle or amount of rotational movement of the transducer 30 from a predetermined reference position on the disk 12. With respect to FIG. 1, this reference position is the servo sector 26a. More specifically, because the axis of rotation 22 of the disk 12 is not along the actual center 18 of the disk 12, during rotation thereof, the transducer 30 does not maintain an aligned position relative to the center of each of the tracks 16. That is, the position of the transducer 30 varies relative to the disk track center. In conjunction with FIG. 2, and the embodiment of the disk 12 which includes thirty-two servo sectors 26, thirty-two discrete values or magnitudes associated with runout are obtained using the information stored in the servo sectors 26. Eight of such values are identified in FIG. 2 as 26a–26g.

In connection with the runout associated with FIGS. 1 and 2, when at the servo sector 26a, the transducer 30 is located a distance d1 from an offset average distance, the determination of which will be discussed later. When the transducer 30 is positioned over sectors 26b, 26c, 26e, 26f and 26h of the same track 16, the transducer 30 is located distances d2, d3, d5, d6, d8, respectively, from the average offset. With respect to sectors 26d and 26g, the transducer 30 is located a distance corresponding to the average offset away from the center of the track 16.

From the discrete values determined at each servo sector 26, a representation of the runout illustrated in FIG. 2 can be determined in the form of a series of sines and cosines comprising a fundamental frequency and harmonics of the fundamental frequency. This representation can be found using discrete fourier transform analysis. This sinusoidal representation results in a desired removal of the influence of noise or non-periodic motion on the runout representation, which noise or non-periodic motion typically accompanies the position information. Consequently, since an accurate runout representation is achieved by discrete fourier analysis, an accurate and reliable compensating signal can be developed. In one embodiment, because a sinusoidal signal that includes only the fundamental frequency represents the runout to a very good approximation, the runout is represented as a sinusoid using only the fundamental frequency and the offset average.

Figure 3:
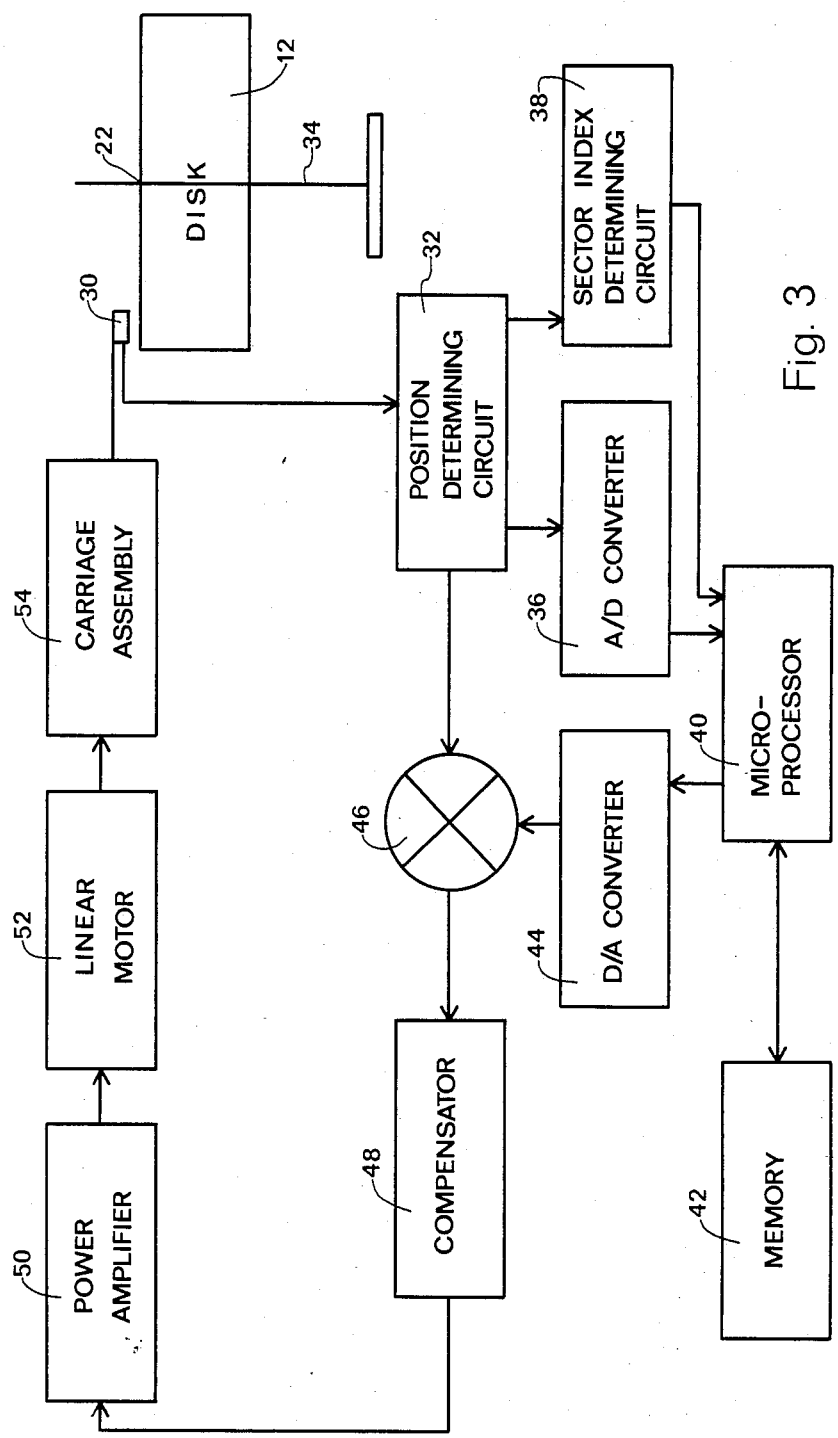
FIG. 3 is a block diagram of the present invention.

With the description of the problem completed, reference can now be made to FIG. 3 which provides a block diagram of a preferred apparatus for eliminating or reducing the runout. In particular, the apparatus includes a position determining circuit 32 which receives its input from the transducer 30 as the disk 12 rotates about its axis of rotation 22 using a spindle assembly 34. The servo or position information provided on the disk 12 at each of the servo sectors 26 is used by the position determining circuit 32 to determine the distance the transducer 30 is away from the center of a given track 16 during the time that the transducer 30 is located to receive servo information from a servo sector 26.

In the preferred embodiment, the position determining circuit 32 used is the circuit described in U.S. patent application Ser. No. 547,308, filed Nov. 1, 1983, entitled "Method and Apparatus for Controlling Head Movement Relative to a Disk in an Embedded Servo System", and assigned to the same assignee as the present invention. The disclosure of U.S. patent application Ser. No. 547,308 is hereby incorporated by reference.

The position-related analog signal outputted by the position determining circuit, obtained each time the transducer 30 receives servo information from a servo sector 26, is applied to an A/D converter 36. The output of the position determining circuit 32 is also sent to a sector index determining circuit 38. The circuit 38 outputs information concerning the identity of the index or reference servo sector 26a. This information is received by a microprocessor 40 which uses this information to determine which one of the servo sectors 26 is being accessed. The digital output from the A/D converter 36 is also transmitted to the microprocessor 40, which communicates with a memory 42. The microprocessor 40 executes the software instructions stored in the memory 42 for determining offsetting runout values, which are used to compensate for the runout. The steps necessary to determine the runout using the discrete fourier transform analysis will be discussed in detail later. The microprocessor 40 generates and outputs a digital compensating signal for use in maintaining the transducer 30 in alignment over the desired track center and, concomitantly, eliminating the runout.

The digital signal outputted by the microprocessor 40 is applied to a D/A converter 44, which receives the digital compensating or correcting signal determined by the microprocessor 40 and converts it to an analog signal. The analog compensating signal outputted by the D/A converter 44 is sent to a summing junction 46. The summing junction 46 also receives the transducer 30 position signal outputted by the position determining circuit 32. The summing junction 44 combines these two signals and applies the compensating signal outputted therefrom to a compensator 48. The compensator 48 outputs the compensating signal to a power amplifier 50. After amplification of the compensating signal by the power amplifier 50, it is applied to a linear motor 52, which is used to drive a carriage assembly 54. The carriage assembly 54 is connected to the transducer 30 and movement of the carriage assembly 54, as driven by the linear motor 52, results in positioning of the head 30 relative to different concentric tracks 16 on the disk 12.

The compensator 48 is a conventional device or circuit that is required to assure that the transducer 30 does not move in an oscillatory manner about a desired track location at which a read or write operation is to be made. Because the closed loop design of the present invention involves the linear motor 52, there is inherent instability in the apparatus. As a consequence, the compensator 48 is provided to prevent the occurrence of conditions which result in such an unstable, oscillatory state.

In conjunction with determining the runout associated with each servo sector 26 so that a compensating value can be generated to develop desired movement of the carriage assembly 54, the present invention utilizes the discrete fourier transform. Generally, the principles of the discrete fourier transform are used to determine the magnitude of the amplitude of the fundamental frequency of the sinusoidal represented runout at each of the servo sectors 26. To accomplish this objective, the formulas associated with the discrete fourier transform have been modified for determining only the single fundamental frequency in accordance with one embodiment of this invention. The formulas have further been modified to reflect the fact that, in the embodiment discussed herein, each of the thirty-two servo sectors 26 of the disk 12 is sampled eight times to obtain an average distance value for each of the servo sectors 26. This average value is a more accurate representation of the transducer 30 location relative to the track center. With these modifications, the discrete fourier transform for a single frequency can be defined as:

$$Fre = 1/N \sum_{n=0}^{N-1} \frac{1}{8}(f(n) + f(n + 32) + f(n + 64) + \ldots f(n + 224))\cos(2\pi n l/32)$$

$$Fim = 1/N \sum_{n=0}^{N-1} \frac{1}{8}(f(n) + f(n + 32) + f(n + 64) + \ldots f(n + 224))\sin(2\pi n l/32)$$

$$f(n) = Fre \cos(2\pi n/32) + Fim \sin(2\pi n/32)$$

where:

Fre is the real part of the vector associated with the amplitude of the fundamental frequency;

Fim is the imaginary part of the vector associated with the amplitude of the fundamental frequency;

f(n) is the vector sum of the real part (Fre) and imaginary part (Fim) and corresponds to the amplitude of the fundamental frequency for the sector n of the servo sectors 26;

N=32 (the number of servo sectors 26 in this embodiment);

n=0, 1, 2, ..., 31 (representing each of the individual 32 servo sectors 26 of this embodiment); and 1/32=X/n, where X/n represents the period of the runout per the total number of samples or position values taken in that period.

In addition to determining the magnitude of the amplitude of the fundamental frequency, the present invention also determines the value of the DC component or offset associated with the runout from a known, reference level. This reference level is the center of the concentric track 16, the runout of which is determined. In the preferred embodiment, the magnitude of the offset is determined by obtaining the average value of all of the position samples or data taken at each of the servo sectors 26. In the case of thirty-two servo sectors 26, each of which is sampled eight different times during eight revolutions of the disk 12, 256 data position samples are obtained and averaged to determine the offset average.

In operation of the present invention, the runout is determined first before accessing a desired track 16 of the disk 12 in order to read or write information. Further, in the preferred embodiment, the tracks 16 are grouped according to zones, i.e. each track 16 is defined as being located in one zone of a number of zones. And, the runout for each of the tracks 16 in a particular zone is essentially the same. Before accessing a track 16 in order to read or write, the runout representations for all zones are determined. After the runouts for the zones are determined, the present invention is able to compensate for the runout in each zone to maintain the transducer 30 in alignment with the center of the desired track 16.

The grouping of the tracks 16 into zones and determining the runout for each zone is implemented primarily because the DC component or offset of the runout signal typically varies among the different zones. The difference between the DC components of the runout for any two zones is usually significantly greater than is the difference between the two sinusoidal or AC components. The determination of the runout then for the different zones assures an accurate representation thereof.

In determining the representation of the runout for a particular zone, the transducer 30 reads the servo information found in each of the servo sectors 26 for a track 16 located in the zone. This position information is obtained eight times during eight revolutions of the disk for a particular concentric track 16. The position information is outputted from the position determining circuit 32 and received by the microprocessor 40 through the A/D converter 38. The microprocessor 40 uses the discrete fourier transform formulas defined herein under software implementation. In particular, the magnitude of Fre and the magnitude of Fim are determined using the sum of the averages of the real vectors and the sum of the averages of the imaginery vectors, respectively, for each of the servo sectors 26. From the values of Fre and Fim, f(n) for each servo sector 26 can be determined. This determination is made by the microprocessor 40 virtually at the same time a servo sector 26 ia accessed by the transducer 30 so that a compensating signal can be generated for f(n) by the microprocessor 40 and applied to the linear motor 52 at the same time that correction is required in conjunction with the movement of the carriage assembly 54. Specifically, the digital compensating signal generated by the microprocessor 40 for a particular servo sector 26 is first applied to the D/A converter 40 which outputs an analog version of the compensating signal. This determined analog signal is sent to the summing junction 46. The output of the summing junction 46 is sent to the compensator 48. The output of the compensator 48 is amplified by the power amplifier 50 and provides the desired power input to the linear motor 52. The energization of the linear motor 52 causes movement of the carriage assembly 54 so that the transducer 30 is maintained along the center of the track 16 and the runout is substantially eliminated due to the compensating movement of the carriage assembly 54 and the transducer 30 connected to the carriage assembly 54.

Although the present invention has been described with reference to a disk having thirty-two servo sectors, it should be appreciated that the invention applies as well to disks having continuously available servo data, as well as disks having a different number of servo sectors, with the discrete fourier transform formulas being appropriately modified for use with any such embodiment. It should also be understood that the present invention is not necessarily limited to the use of only the fundamental frequency of the sinusoidal representation of the runout. In those instances in which the apparatus, particularly the processing unit thereof, has sufficient time to make the necessary calculations, the discrete fourier transform formulas can be used to determine the magnitudes of the amplitudes for one or more harmonics of the fundamental frequency. Based on such determinations, more accurate representations of the runout are achieved.

In connection with the steps for determining Fre, Fim and f(n), the microfiche appendix accompanying this application includes software used for making the required analysis and calculations, such software being used with a Motorola 6803 microprocessor.

Based on the foregoing description, a number of worthwhile advantages of the present invention are readily discerned. The problem of disk runout is essentially eliminated by determining a representation of the runout and then generating a compensating or correcting signal to keep the transducer in alignment with a desired track center. The method of the present invention provides an accurately determined sinusoidal representation of the runout using the discrete fourier transform. The method is readily implemented and works efficiently to maintain track and transducer alignment during the rotation of the disk. Because discrete fourier transform analysis is employed, any noise accompanying the position information is effectively removed so that the noise does not meaningfully affect the runout representation. Furthermore, the method of the present invention is not concerned with response time associated with determining the runout and providing a compensating signal at the appropriate time. Instead, the present invention determines Fre and Fim prior to the read or write so that only f(n) need be determined, which determination can be made at virtually the same time a servo sector is being accessed by the transducer.

Although the present invention has been described with reference to particular embodiments thereof, it should be appreciated that still further modifications and variations can be effected within the spirit and scope of this invention.

What is claimed is:

1. A method for reducing runout associated with a read/write head and a rotating disk having a number of tracks, comprising:
   obtaining position information relating to the runout;
   transforming the position information into a form representative of the runout, wherein said step of transforming includes representing the runout using at least a first sinusoidal component and a second sinusoidal component, said second sinusoidal component being separately determined from said first sinusoidal component, and in which said representing of the runout includes:
   determining a first magnitude relating to an amplitude of said first sinusoidal component using said position information, and
   determining a second magnitude relating to an amplitude of said second sinusoidal component using said position information;
   generating a runout compensating signal using the representation of the runout; and
   using the runout compensating signal so that the read/write head is moved to compensate for the runout.

2. A method, as claimed in claim 1, wherein:
   the step of generating a runout compensating signal includes using only fundamental frequency sinusoidal components.

3. A method, as claimed in claim 1, wherein:
   the disk tracks are grouped into a number of zones, and the steps of obtaining position information, transforming the position information, and generating a runout signal are carried out for each of the zones of the disk.

4. A method, as claimed in claim 1, wherein:
   the step of transforming the position information includes obtaining an average distance of the head away from a disk track center for a number of locations along a track center during the rotation of the disk, and using said average distances to determine an offset average relating to the runout.

5. A method, as claimed in claim 1, wherein:
said generating step includes, each time a runout compensating signal is generated, using only the representation of the runout in generating the runout compensating signal.

6. In a system for reducing runout associated with a rotating disk, an apparatus comprising:
means for gathering position information related to the runout;
means for reducing said position information to obtain discrete data associated with the runout;
means for determining a representation of the runout using said discrete data, said means for determining including means for determining a first sinusoidal component and for separately determining a second sinusoidal component, said first sinusoidal component having an amplitude and said second sinusoidal component having an amplitude, each of said amplitudes being separately obtained using said position information and said means for determining; and
means for generating a signal substantially equal to the representation of the runout to compensate for the runout.

7. An apparatus, as claimed in claim 6, wherein:
said means for determining includes means for obtaining an offset average associated with said sinusoidal representation.

8. An apparatus, as claimed in claim 6, wherein;
said means for determining includes means for obtaining an average of a number of position values.

* * * * *